United States Patent [19]

Ziegelmeyer

[11] Patent Number: 4,708,698
[45] Date of Patent: Nov. 24, 1987

[54] DRIVING SPROCKET FOR CONVEYOR CHAIN ON FINGER JOINTING MACHINES

[76] Inventor: Harold R. Ziegelmeyer, 5010 Griffen Ck. Rd., Medford, Oreg. 97501

[21] Appl. No.: 895,506

[22] Filed: Aug. 11, 1986

[51] Int. Cl.⁴ ............................................. F16H 55/30
[52] U.S. Cl. .................................. 474/152; 474/162; 192/56 R
[58] Field of Search ............... 474/152, 158, 162, 165, 474/902, 903; 198/731, 834; 192/56 R; 464/45

[56] References Cited

U.S. PATENT DOCUMENTS

| | | | |
|---|---|---|---|
| 2,038,695 | 4/1936 | Wilmot | 474/162 X |
| 3,483,766 | 12/1969 | Erickson | 474/902 X |
| 3,754,412 | 8/1973 | Briggs | 192/56 R X |
| 4,031,769 | 6/1977 | Kassing | 474/162 |

Primary Examiner—Stephen J. Novosad
Assistant Examiner—Thuy M. Bui
Attorney, Agent, or Firm—Neil J. Driscoll

[57] ABSTRACT

A driving sprocket to drive conveyor chain on a finger jointing machine having a base plate with central aperture therein. Drive hubs are mounted on opposed faces of the base plate and are adapted to be rotated by conventional power transmission equipment. The drive hubs project into the central aperture and clutch plates are interposed in operative series relation between the drive hub and the related face of the base plate. The drive hubs directly and solidly drive the clutch plates. The clutch plates frictionally drive the base plate. Caliper clutch assemblies control the level of frictional engagement between the respective clutch plates and the related face of the base plate.

5 Claims, 9 Drawing Figures

DRIVING SPROCKET FOR CONVEYOR CHAIN ON FINGER JOINTING MACHINES

BACKGROUND OF THE INVENTION

1. Field of the Invention

The invention relates to a driving sprocket to drive conveyor chain on finger jointing machines, said sprocket including a frictional clutch which allows the power transmission train to continue to rotate when the conveyor chain and driving sprocket become locked to material jamming in the jointing machine.

2. Description of the Prior Art

The driving sprocket and frictional clutching arrangement herein disclosed has particular utility in the field of "finger jointing," that is, an area of activity where relatively small segments of lumber are precisely milled to provide a joint of interfitting tongues and grooves, which, through the use of adhesives, will provide wood products of useful dimensional lengths. Typical finger jointing equipment is disclosed in my U.S. Pat. No. 3,760,935, dated Sept. 25, 1973, which patent is incorporated herein by reference. The finger jointing equipment of the referenced patent teaches a chain conveyor comprising parallel link chains. the links are pinned to each other to provide a pivotal connection between the respective links. A chain driving sprocket is disclosed having spaced gear teeth projecting outwardly from the sprocket and engagable with cooperative grooved formations in the underfaces of the links. The entire sprocket appear to be a unitary casting.

SUMMARY OF THE INVENTION

It is the purpose and primary object of the invention to provide a chain driving sprocket for use in finger jointing equipment which, includes a slipable clutch in series relationship with the sprocket and power transmission equipment, whereby the latter may continue to rotate even though the conveyor chain and sprocket are locked due to material jamming in the jointing equipment.

It is further an object of the invention, to provide that the slipable clutch include, clutch plates solidly rotatable with the power transmission train and frictionally engagable with a base member of the sprocket to thereby accommodate, under certain conditions relative rotational movement between the clutch plates and said member of the sprocket.

It is yet another object of the invention to provide demountable and replaceable wear elements and drive teeth without the need of replacing the entire drive sprocket.

These and other objects and advantages of the invention will become apparent in the course of the following description and explanation of a presently preferred embodiment of the invention.

DESCRIPTION OF A PREFERRED EMBODIMENT

Figure 1:
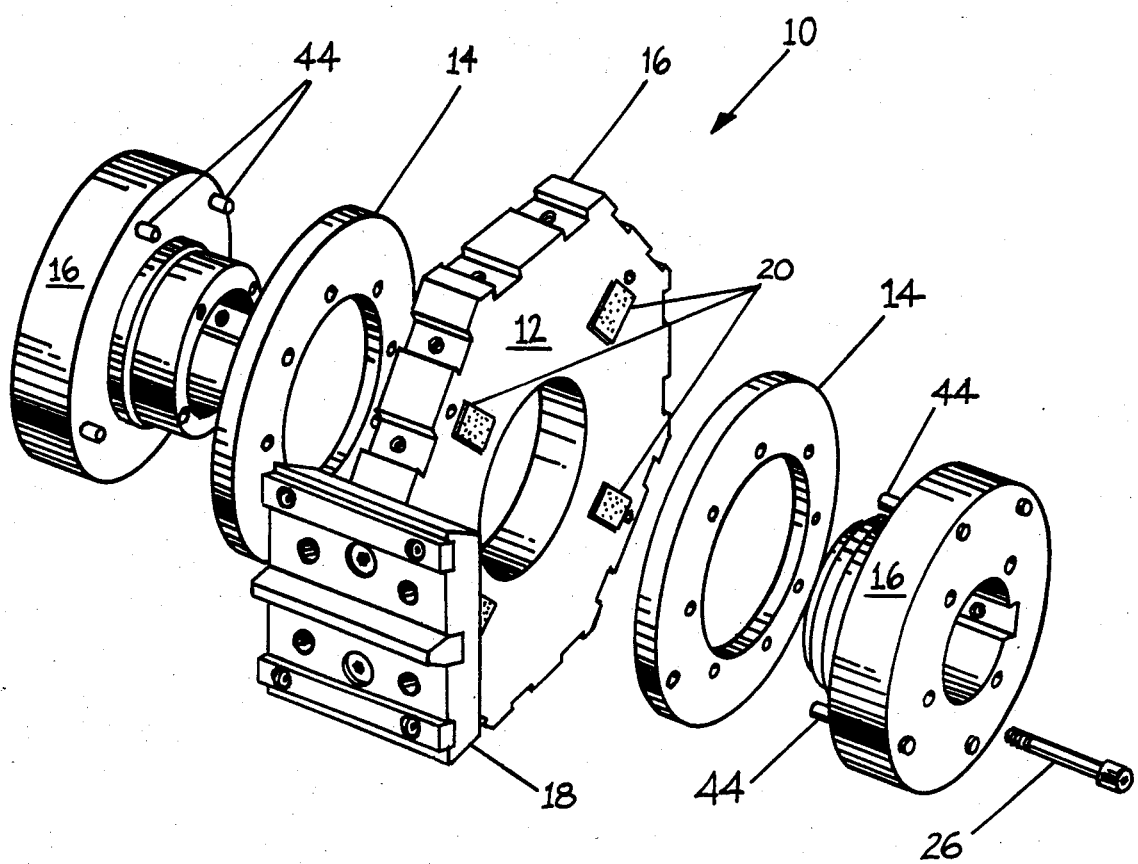
FIG. 1 is an exploded perspective view of a drive sprocket incorporating the invention.
Figure 2:
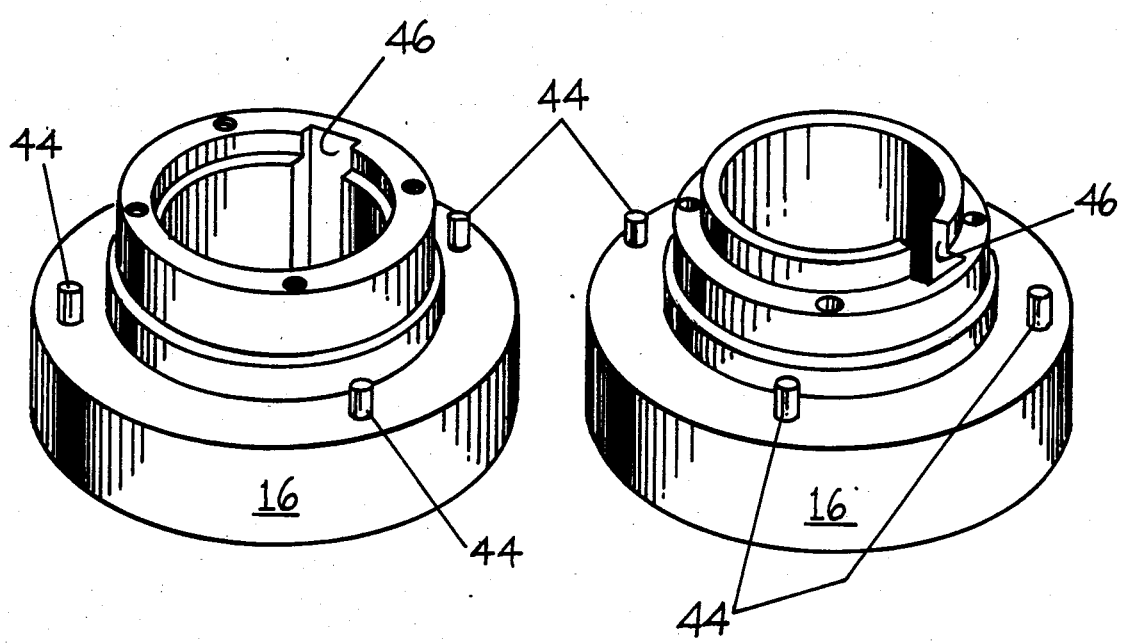
FIG. 2 is a composite perspective view of two driving hubs utilized in the sprocket.
Figure 3:
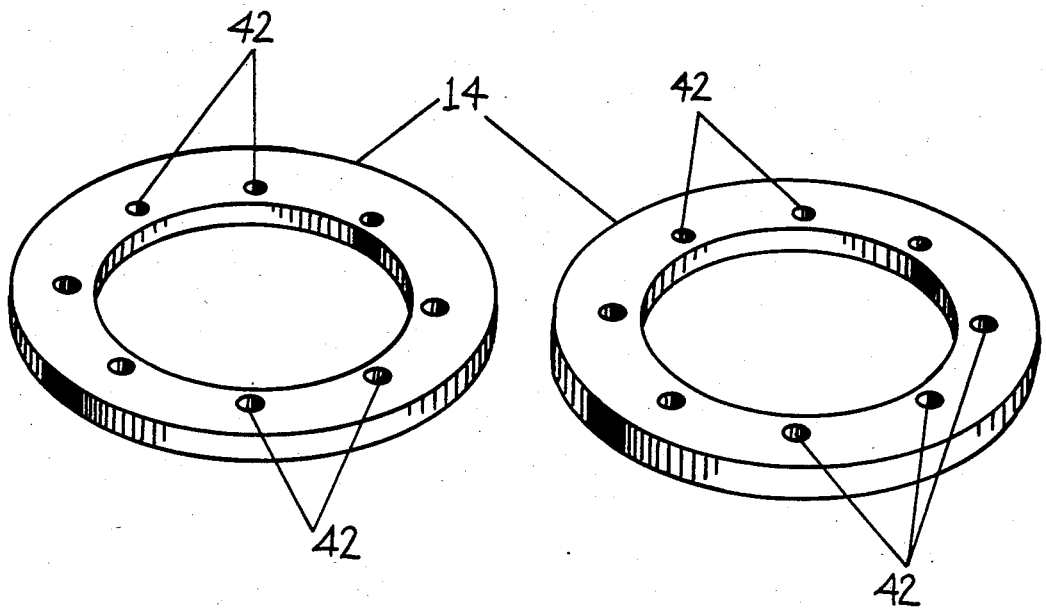
FIG. 3 is a composite perspective view of two clutch plates utilized in the sprocket.

The entire drive sprocket is indicated generally at 10 in the exploded perspective view of FIG. 1. The sprocket 10 comprises a base member 12, clutch plates 14,14 on opposite sides of the base member 12, opposed drive hubs 16,16 and a plurality of driving teeth elements 18,18 mounted annularly to the periphery of the base member 12.

The base member 12 is machined on both opposed faces thereof with cavities to receive replaceable clutch lining material 20,20. In the disclosed preferred embodiment four clutch pads 20 are shown on each face of the base member 12 and for illustrative purposes only, ie., more or less could be used.

Figure 4:
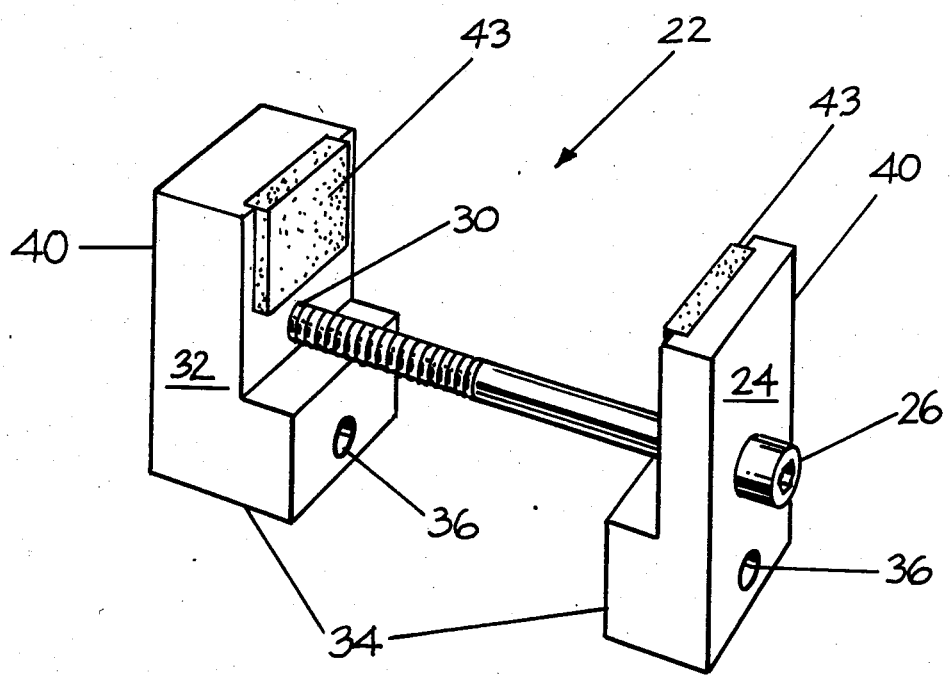
FIG. 4 is a detail perspective view of the caliper clutch assembly utilized in the invention.
Figure 5:
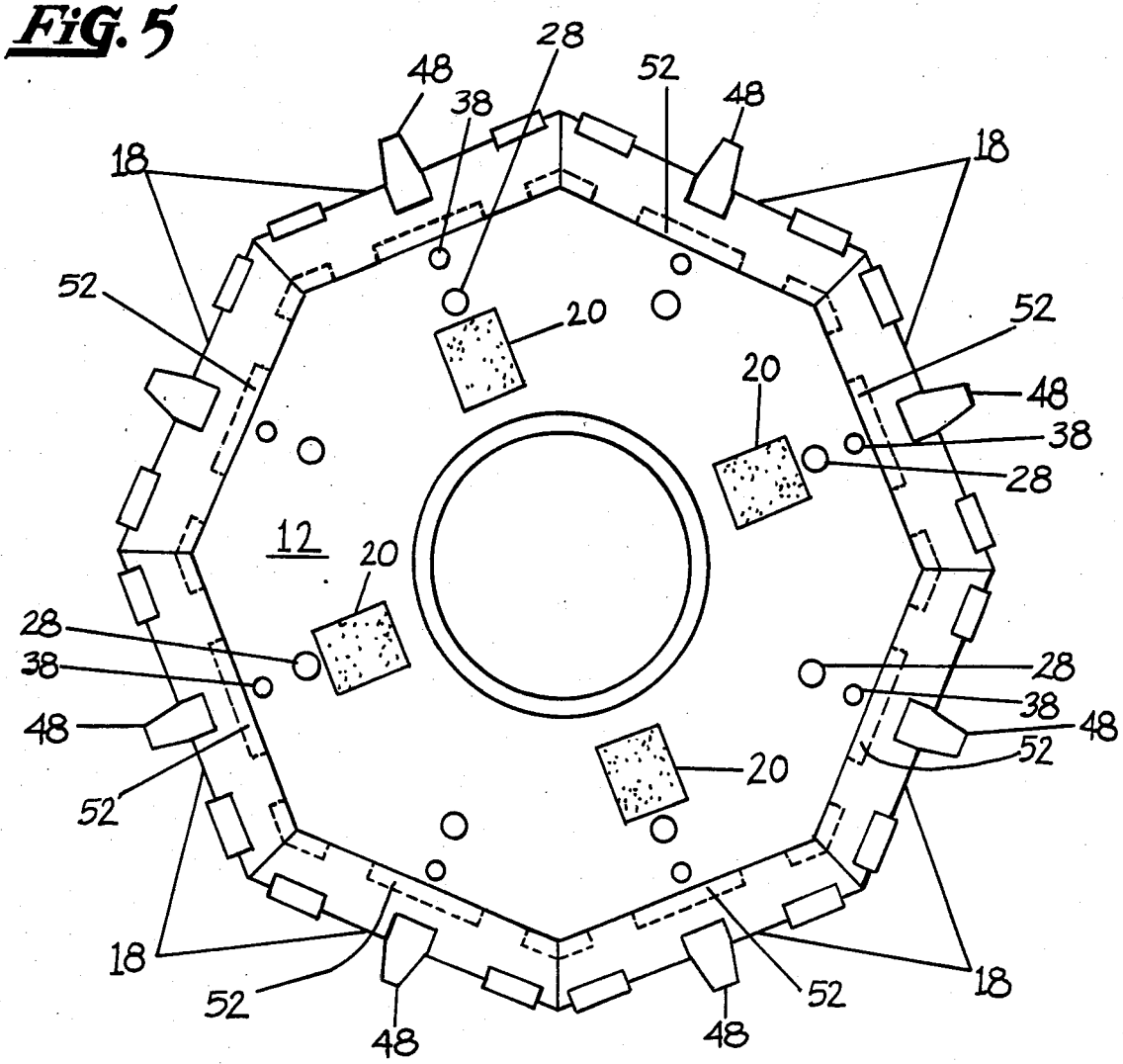
FIG. 5 is a side view elevational view of a base member and drive teeth elements utilized in the sprocket.
Figure 8:
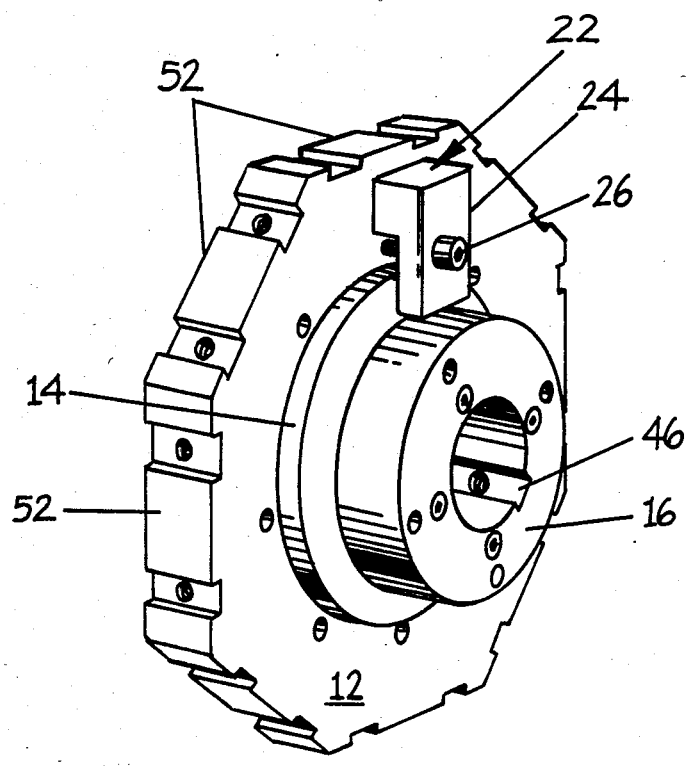
FIG. 8 is a perspective, showing the base member and one drive hub and the relationship thereof to related clutch plate and one half the caliper clutch assembly.
Figure 9:
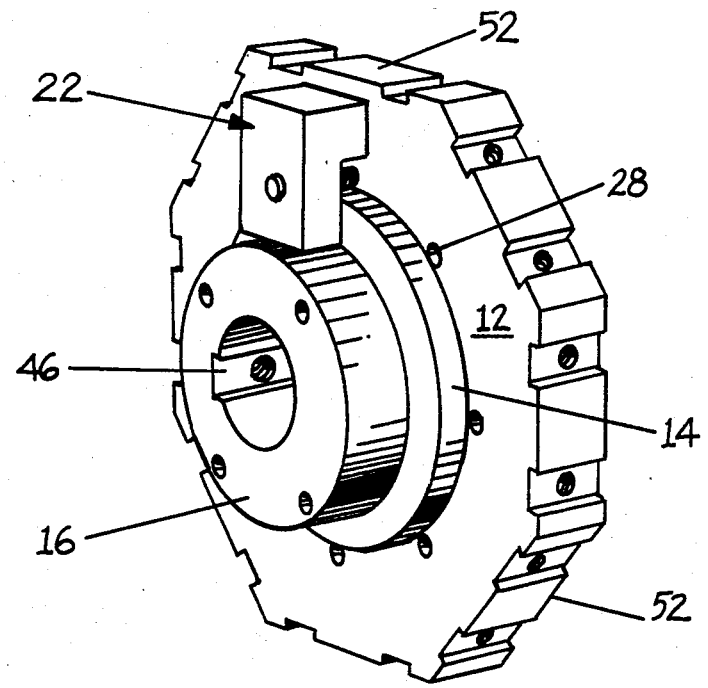
FIG. 9 is a perspective showing the base member and another drive hub, on the other side of the base member from the showing in FIG. 8, and the relationship thereof to another clutch plate and the other half of the caliper clutch assembly.

FIG. 4 shows in detail the structure of a caliper clutch drive assembly indicated generally at 22. The caliper clutch drive assembly 22 comprises a first clutching element 24 having a hole therein to accommodate the passage of socket head bolt 26. The bolt 26 then passes through an opening 28 in base member 12 and is then threadably received in an appropriate threaded opening 30 in second clutching element 32. The bases 34,34 of the clutching elements 24 and 32 are provided with holes 36,36, which, in the complete assembly, receive dowel pins 38,38, the latter being press fitted into the base member 12. The projecting fingers 40,40 of the bases 34,34 are machined with appropriate cavities which receive replacable clutch lining material 43,43. In FIGS. 8 and 9 only one set of caliper clutch drive assemblies 22 is illustrated. However, as seen in FIG. 5 the base member 12 of the illustrated embodiment has been disclosed to employ four caliper clutch drive assemblies and it will be understood that more or less could be utilized.

The clutch plates 14,14 are provided with a plurality of holes 42,42 which receive drive pins 44,44, said pins 44,44 being press fitted into drive hubs 16,16. The drive hubs 16,16 are provided with internal keyways 46,46 which may be drivingly keyed to a powered drive shaft (not shown) from any conventional power source (not shown). It will thus be understood that only the following segments of the drive sprocket are in direct, solid connection with the powered drive shaft (not shown), ie., the drive hubs 16,16 and the clutch plates 14,14. Rotative power transmission to the base member 12 is dependent upon the frictional interface between the clutch plates 14,14 and the clutch lining material 20 and 42. The frictional interface may be varied by increasing the torque on socket head bolt 26, thereby increasing the clamping pressure in plates 14.

Figure 6:
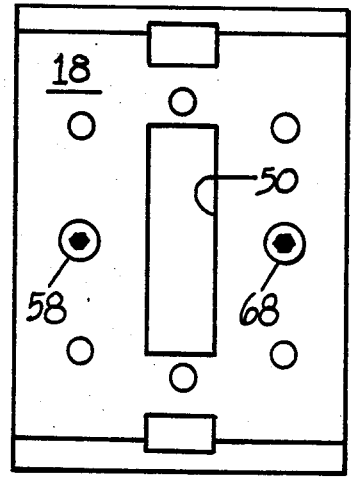
FIG. 6 is a plan view of the rear face of a drive tooth element utilized in the sprocket.
Figure 7:
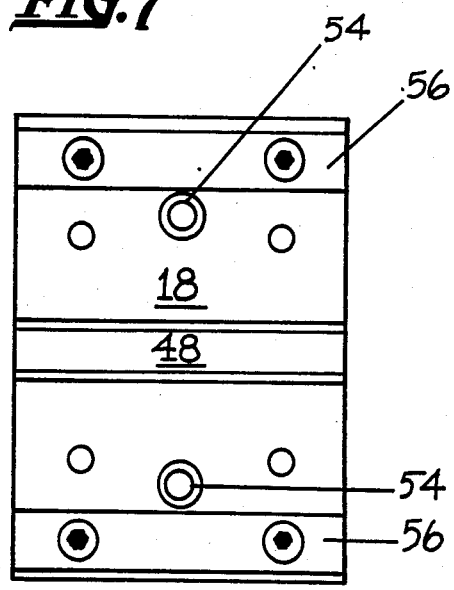
FIG. 7 is a plan view of a front face of a drive tooth element utilized in the sprocket.

FIGS. 6 and 7 are, respectively, bottom and top plan views of the driving teeth elements 18,18. Each element 18 may be secured to the base member 12 with socket head cap screws (not shown) which are disposed in the holes 54,54. A single driving tooth 48 is secured to the element 18 by having the lower portion of the tooth 48 press fitted into a slot formed transversely in the upper face of the element 18 and by screws 58,68 threadably projecting into the tooth 48 from the rear surface of element 18 (FIG. 6). Cavities 50 are also machined into the rear face of the element 18 to accommodate the press fit of the bosses 52 of the base member 12. Demountable wear plates 56,56 are also mounted to the rear face of element 18. The end elevational view, ie., the profile, of the tooth 48, is that of a conventional gear tooth.

From the above it will be apparent that a conveyor drive sprocket for use on finger jointing equipment which includes a frictional clutching mechanism in series relationship with the conventional power transmission equipment which allows the power transmission equipment to continue to rotate in the event the conveyor and the conveyor driving sprocket become locked due to material jamming in the finger jointing equipment.

Having described the presently preferred embodiment of the equipment, it is to be understood the description is by way of illustration and not limitation and that the described invention may be subject to certain modifications all within the spirit and scope thereof.

What is claimed is:

1. In a driving sprocket for driving a conveyor chain on finger jointing machines, the combination of
    a base plate having a central aperture therein,
    drive hub members on both sides of the base plate, each member being mounted to the base plate in determined relation to the central aperture,
    clutch plates on opposite sides of the base plate and operatively interposed between the base plate and the related drive hub member,
    said hub members being adapted for connection to conventional power transmission means,
    the respective drive hub members being directly connected to the related clutch plate to induce rotation of the latter,
    driving teeth elements peripherally mounted on the base plate, and
    caliper clutch assemblies to grip the respective clutch plates on opposite sides of the base plate and induce frictional interconnection between the drive hub members and the base plate.

2. A driving sprocket for driving conveyor chain on finger jointing machines according to claim 1, wherein
    said driving teeth elements include a lower plate,
    said plate being removably keyed and bolted to the periphery of the base plate,
    at least one driving tooth removably mounted on each lower plate, and
    removable wear plates mounted on said lower plate and projecting above the surface of said lower plate.

3. A driving sprocket for driving conveyor chain on finger jointing machines according to claim 2, wherein
    there is only one driving tooth on each lower plate, and
    there are two wear plates on each lower plate and the wear plates are mounted at opposed ends of the lower plate.

4. A driving sprocket for driving conveyor chain on finger jointing machines according to claim 6, wherein the respective caliper clutch assemblies comprise
    a first clutching element on one side of the base plate and fixedly mounted thereto and a second clutching element on the opposed side of the base plate and fixedly mounted thereto,
    said first and second clutching elements each having fingers overlying and frictionally engaging the respective clutch plates on the related side of the base plate, and
    adjustable means to vary the level of frictional engagement between the respective fingers and the related clutch plate.

5. A driving sprocket for driving conveyor chain on finger jointing machines according to claim 4, wherein said adjustable means comprises
    threadable means interconnecting the first and second clutching elements.

* * * * *